(12) United States Patent
Paulino

(10) Patent No.: US 6,467,217 B1
(45) Date of Patent: Oct. 22, 2002

(54) SYSTEM FOR DOMESTIC CULTIVATION OF EXOTIC PLANTS

(76) Inventor: Romulo B. Paulino, 1822 N. Ave. 53, Los Angles, CA (US) 90042

( * ) Notice: Subject to any disclaimer, the term of this patent is extended or adjusted under 35 U.S.C. 154(b) by 0 days.

(21) Appl. No.: 09/642,415

(22) Filed: Aug. 19, 2000

(51) Int. Cl.[7] ............................................... A01B 79/00
(52) U.S. Cl. ....................................................... 47/58.1
(58) Field of Search ............................ 47/58.1, 1.01 R, 47/65.6

(56) References Cited

U.S. PATENT DOCUMENTS 4,920,694 A * 5/1990 Higa .............................. 47/58
6,189,263 B1 * 2/2001 Solis ........................... 47/65.6

* cited by examiner

Primary Examiner—Peter M. Poon
Assistant Examiner—Bethany L. Griles
(74) Attorney, Agent, or Firm—Goldstein & Lavas, P.C.

(57) ABSTRACT

A system for cultivating tropic plants in a garden having a ground surface. A hole is initially dug to a depth of approximately three feet below the ground surface. A layer of ceramic tiles is established at the bottom of the hole, and is covered with a layer of small rocks, and a layer of vegetative cuttings. Then a layer of manure is established which is substantially two feet in depth. Then fertile top soil originally from the hole is replaced in a mix with sand to a depth of substantially one foot. The contents are allowed to settle and are thoroughly watered. The exotic plant is then planted in potting soil thereabove, and is maintained and allowed to thrive by the unique moisture, nutritive and thermodynamic properties established by the various layers.

5 Claims, 4 Drawing Sheets

SYSTEM FOR DOMESTIC CULTIVATION OF EXOTIC PLANTS

BACKGROUND OF THE INVENTION

The invention relates to a system for domestic cultivation of exotic plants. More particularly, the invention relates to a system which allows exotic plants to grow in colder climates where such plants would not ordinarily thrive or even survive.

Some of the most beautiful plants are found in exotic settings. In particular, many sought-after species of flowers are only found growing in The Orient. When western gardeners seek to grow these plants under the climate conditions of their own locale, such plants will not thrive, and will typically die. Even if these plants live during the summer, they will not typically survive the winter, even in the warmest climates in the United States.

One attempted solution is to grow such plants indoors. However, indoor nurseries can only cultivate a plant and keep it healthy while it remains indoors. Thus, they are suitable for commercial production of plants for medical uses and the like. They still do not allow these plants to be enjoyed in a more natural outdoor garden setting.

Accordingly, while these units may be suitable for the particular purpose employed, or for general use, they would not be as suitable for the purposes of the present invention as disclosed hereafter.

SUMMARY OF THE INVENTION

It is an object of the invention to produce a system which allows exotic plants to be cultivated in colder domestic settings. Accordingly, the present invention provides a system which allows these plants to thrive despite the colder weather encountered in climates such as those found in the United States.

It is a further object of the invention to provide a system which allows exotic plants to grow at a faster rate. Accordingly, the present invention provides unique moisture, heat retention, and nutritive properties which are ideally suited to the cultivation of exotic plants.

It is another object of the invention to provide a system which is inexpensive to implement, and is environmentally friendly. Accordingly, the system requires the use of natural materials and waste products which are readily available.

It is still another object of the invention to provide a system which is simple to implement. Accordingly, the system merely requires the careful, ordered layering of the specified materials. The controlled layering according to the present invention provides an idealized environment for exotic plants to thrive.

The invention is a system for cultivating tropic plants in a garden having a ground surface. A hole is initially dug to a depth of approximately three feet below the ground surface. A layer of ceramic tiles is established at the bottom of the hole, and is covered with a layer of small rocks, and a layer of vegetative cuttings. Then a layer of manure is established which is substantially two feet in depth. Then fertile top soil originally from the hole is replaced in a mix with sand to a depth of substantially one foot. The contents are allowed to settle and are thoroughly watered. The exotic plant is then planted in potting soil thereabove, and is maintained and allowed to thrive by the unique moisture, nutritive and thermodynamic properties established by the various layers.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

Figure 1:
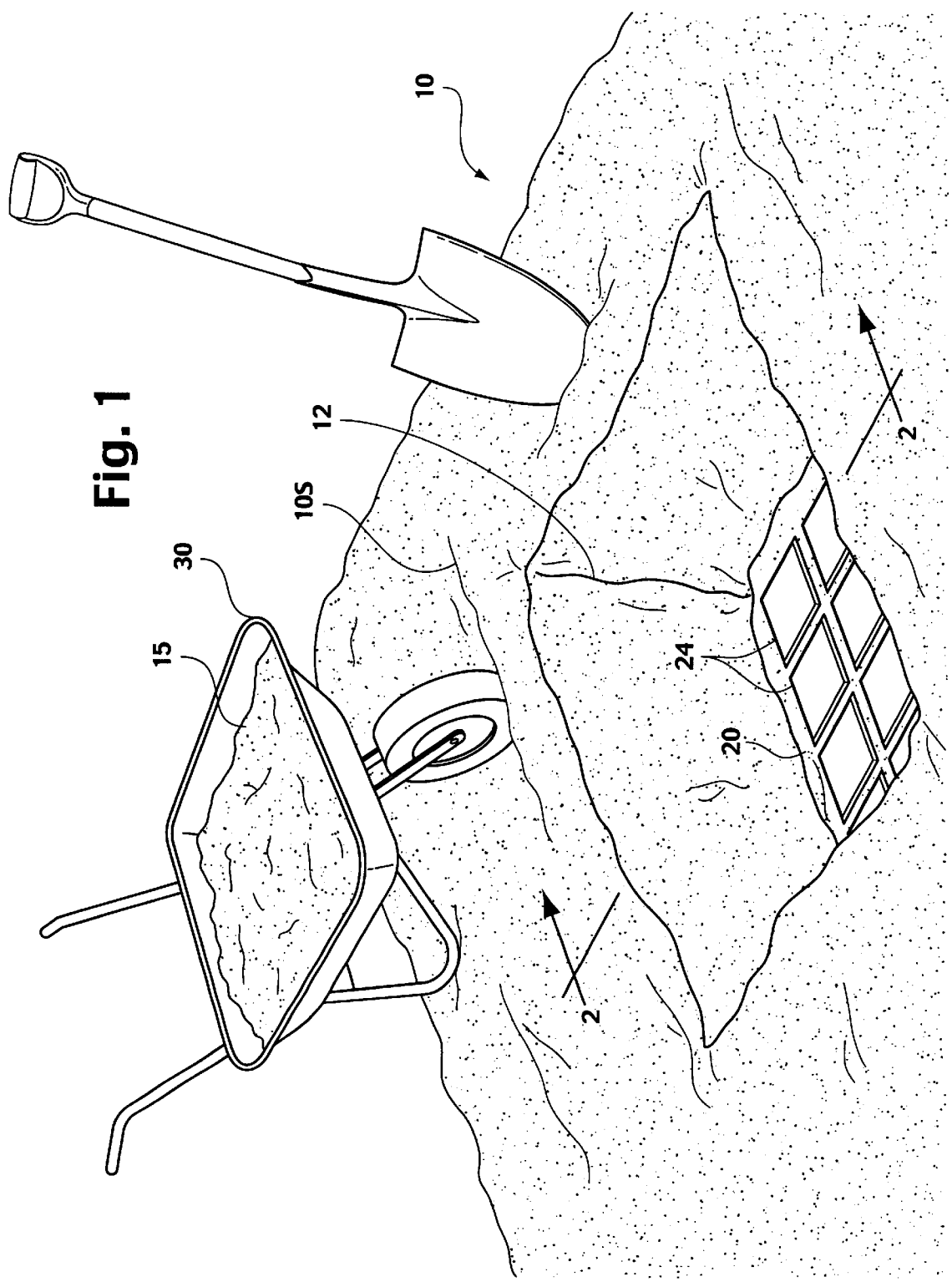
FIG. 1 is a diagrammatic perspective view, illustrating early steps of the inventive system, wherein a hole has been dug and soil removed from the ground, and wherein a base layer of tiles has been placed at the bottom of the hole.

FIG. 1 illustrates a garden 10, having a ground surface 10S. A hole 12 has been dug within said garden 10. The hole 12 preferably extends about three feet below the ground surface 10S. When the hole 12 is dug, top soil 15 extending approximately one foot of the soil depth is stored in a storage bin such as a wheel barrow 30, as illustrated. The hole 12 is illustrated in FIG. 1 as having finite boundaries. However the hole 12 may in fact be a trench or canal of considerable length.

Once the hole 12 has been dug to a satisfactory depth, a base layer 20 is created using ceramic tiles 22. The tiles 22 are preferably standard four inch by four inch shiny (glazed) tiles, and are placed close together, with a gap between tiles which is preferably one half inch.

Figure 2:
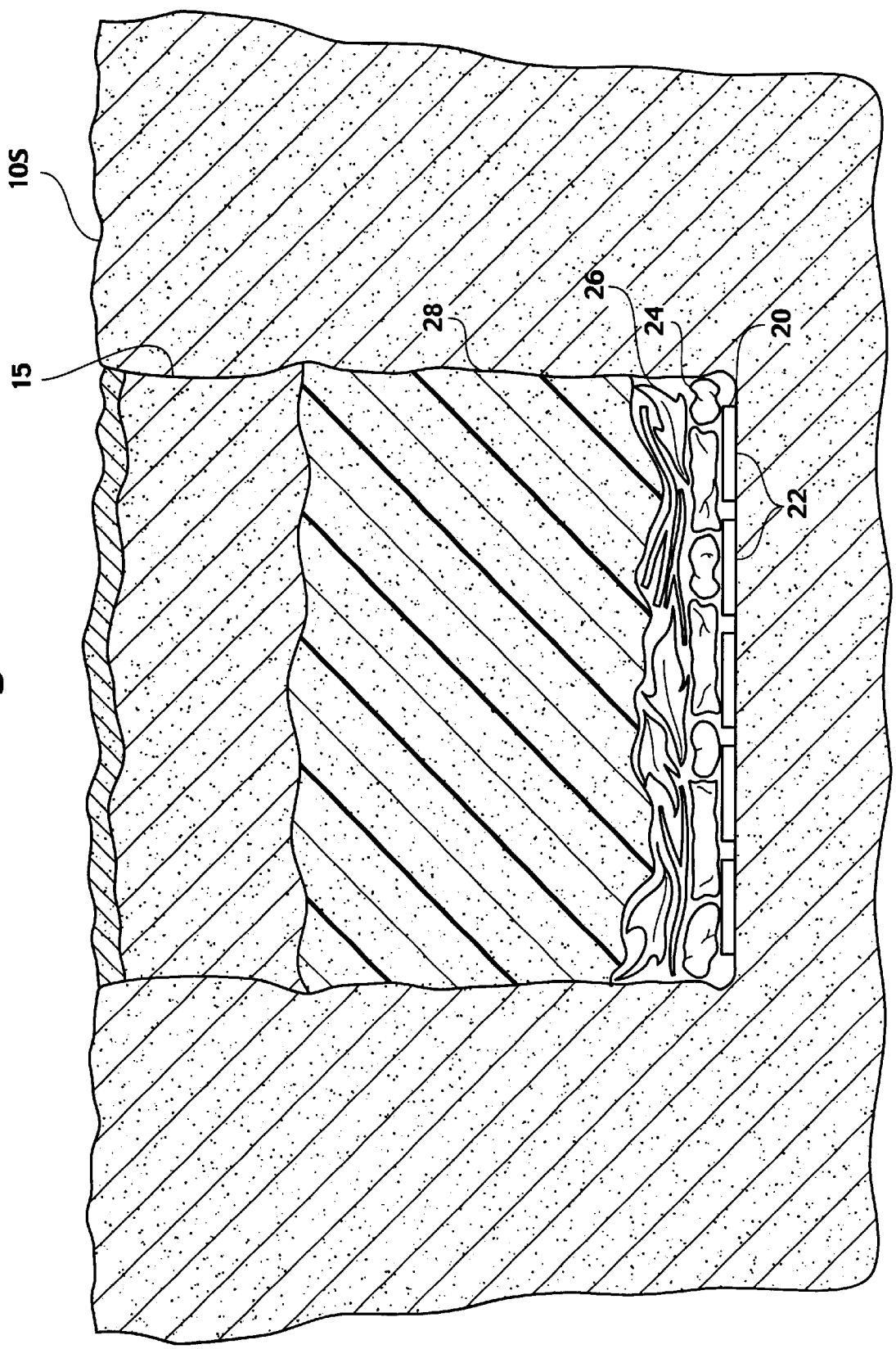
FIG. 2 is a cross sectional view, wherein the soil preparation prior to planting has created an ordered layering of materials according to the present invention.

Referring to FIG. 2, once the base layer 20 has been created using the tiles 22, additional layers then cover the base layer 20. In particular, a layer of small rocks 24, which may comprise gravel or broken cement, is placed directly over the tiles 22 of the base layer 20. Then, a layer of vegetative cuttings 26 is placed over the layer of small rocks 24. The vegetative cuttings 26 can be cut branches, leaves, twigs, or the like.

A layer of manure 28 of placed over the vegetative cuttings 26, the layer of manure can be up to two feet deep. Chicken, steer, or horse manure can be used—whichever is most convenient.

Above the manure 28, the top soil 15 is replaced. However, the top soil 15 is preferably mixed with sand, and then is used to create the uppermost one foot layer, which should reach the same level as the original ground surface 10S. Only fertile top soil 15 should be used. Non-fertile soil should be discarded elsewhere.

Figure 3:
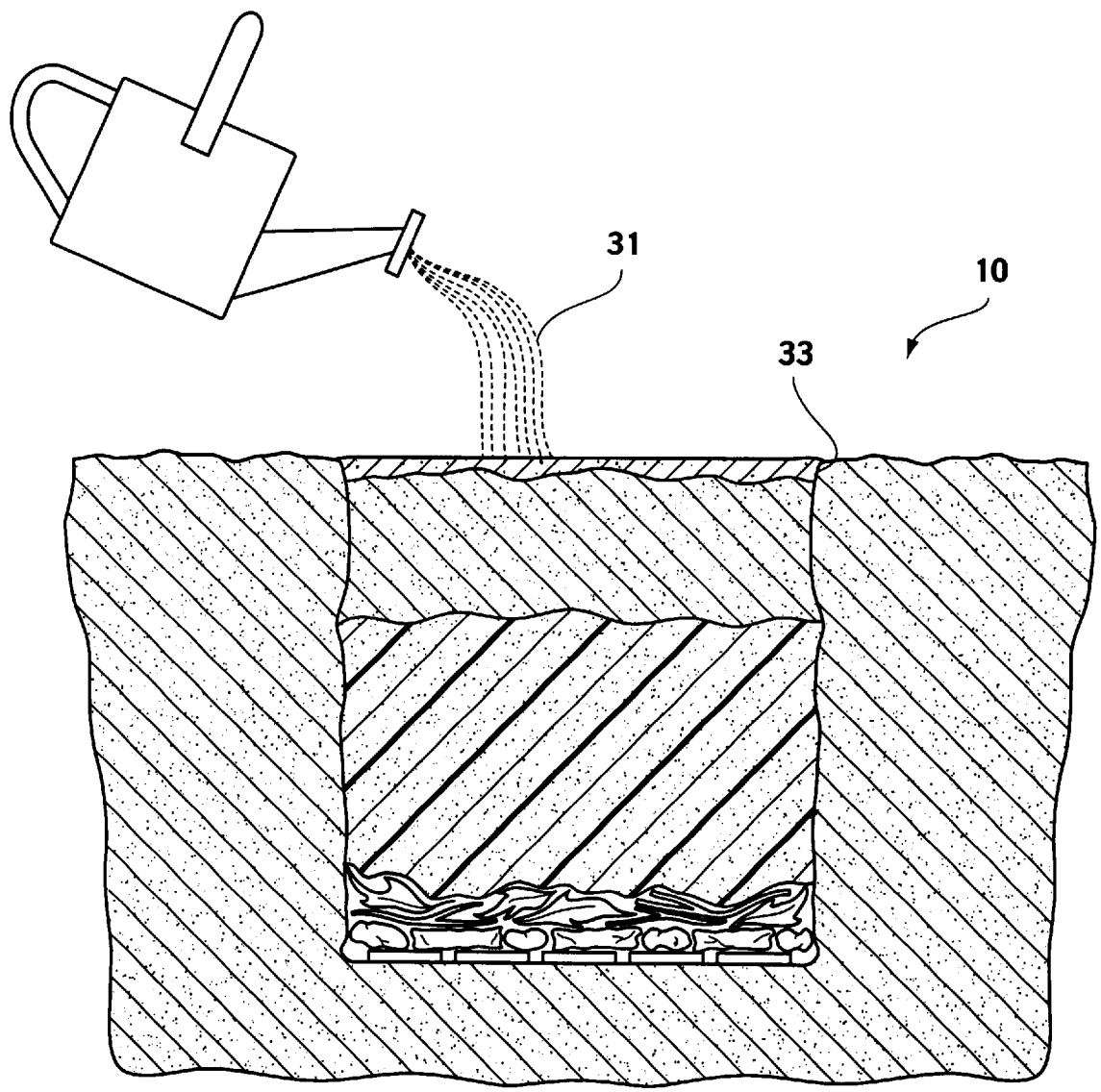
FIG. 3 is a cross sectional view, similar to FIG. 2, wherein the soil preparation is being thoroughly watered prior to planting.

Once all layers have been established, the contents must settle in order to create a stable environment for planting. The easiest way to compact the soil is for the gardener to step on it with his own body weight. Then, the garden 10 must be watered well, using an ample quantity of water 31, as seen in FIG. 3. Watering the soil will not only add moisture to the various layers, but will also help the components thereof settle properly.

Figure 4:
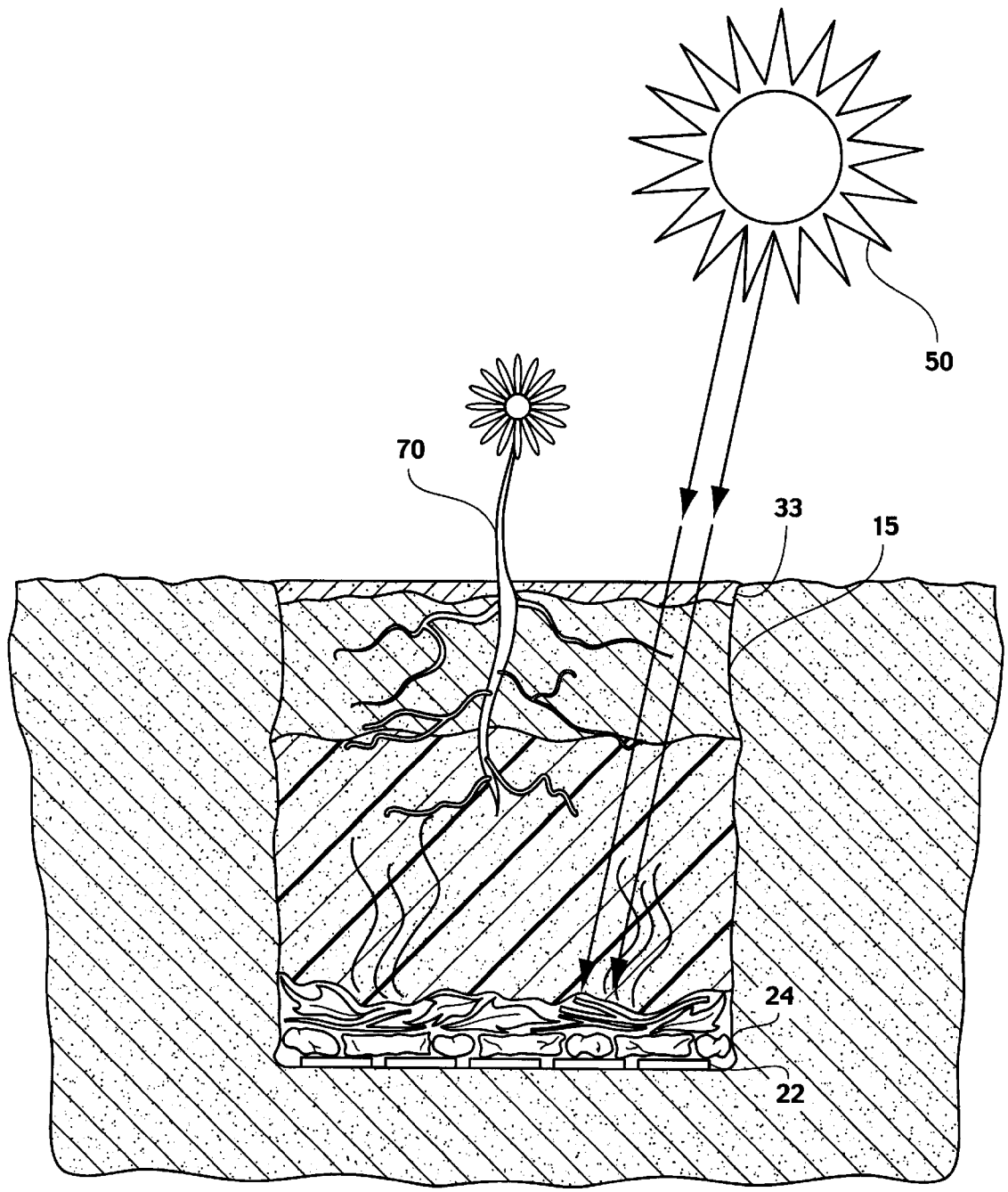
FIG. 4 is a cross sectional view, showing the dynamics of the soil layering according to the present invention, wherein heat from the sun is channeled using the ordered layering, and a exotic plant is thriving therein.

When planting, potting soil 33 should be used. As seen in FIG. 4, an ecosystem is created. Accordingly, heat from the sun 50 penetrates the various layers, and reaches the tiles 22 of the base level 20. The heat is reflected by the shiny surface of the tiles 22, carrying moisture upward from the surrounding area. The layer of small rocks 24 act as a heat accumulator—they are capable of storing a large quantity of heat. However, the top soil layer 15, which includes sand particles, will help hold the heat below, thus creating a warm and moist subterranean region which can be easily tapped by a exotic plant 70.

Accordingly, the ordered establishment of the layers as recited helps create a cultivation system having unique thermodynamic and nutritive properties which keep the exotic plant warm, moist, and well nourished. The environment thus created allows the exotic plants to not only survive, but to thrive, growing faster than they would in their natural habitats.

The invention has been described by example using the accompanying drawing figures and foregoing description. It should be understood, however, that such illustrations are exemplative only. Numerous variations are possible, while adhering to the principles of the invention. Such variations are contemplated as being a part of the present invention.

What is claimed is:

1. A system for cultivating exotic plants in a garden having a ground surface, comprising the steps of:

digging a hole in the garden while saving top soil from said hole;

establishing a base layer of ceramic tiles;

establishing a layer of small rocks therabove;

establishing a layer of vegetative cuttings thereabove;

establishing a layer of manure thereabove;

establishing a layer made of the top soil mixed with sand thereabove;

allowing the layers to settle;

thoroughly watering the layers; and planting a exotic plant near the ground surface.

2. The system for cultivating exotic plants as recited in claim 1, wherein the layer of manure is selected from chicken manure, steer manure, and horse manure.

3. The system for cultivating exotic plants as recited in claim 2, wherein the layer of vegetative cuttings further comprises leaves, branches, and twigs.

4. The system for cultivating exotic plants as recited in claim 3, wherein the hole is dug to a depth of substantially three feet, wherein the layer of manure is substantially two feet deep, and wherein the layer of top soil is substantially one foot deep.

5. The system for cultivating exotic plants as recited in claim 4, wherein the ceramic tiles are substantially four inches by four inches and are spaced substantially one half inch apart.

* * * * *